United States Patent
Kobayashi

(10) Patent No.: US 6,282,047 B1
(45) Date of Patent: *Aug. 28, 2001

(54) RECORDING AND/OR REPRODUCING APPARATUS

(75) Inventor: Junji Kobayashi, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,326

(22) Filed: Oct. 1, 1998

Related U.S. Application Data

(62) Division of application No. 08/567,831, filed on Dec. 6, 1995, now abandoned, which is a continuation of application No. 08/102,764, filed on Aug. 5, 1993, now abandoned.

(30) Foreign Application Priority Data

Aug. 31, 1992 (JP) .................................................. 4-255664

(51) Int. Cl.$^7$ ............................................. G11B 15/46
(52) U.S. Cl. ............................. 360/73.06; 360/73.05; 360/95
(58) Field of Search ........................... 360/71, 73.05, 360/73.06, 73.07, 73.08, 85, 95, 74.1, 93; 358/906, 909.1; 386/117; 348/207

(56) References Cited

U.S. PATENT DOCUMENTS

| | | | | |
|---|---|---|---|---|
| 4,338,640 | * | 7/1982 | Yabu et al. | 360/73 |
| 4,481,551 | * | 11/1984 | Maeda | 360/85 |
| 4,566,047 | * | 1/1986 | Hirose et al. | 360/85 |
| 4,841,391 | * | 6/1989 | Iwasaki et al. | 360/85 |
| 4,961,120 | * | 10/1990 | Mototake et al. | 360/85 |
| 5,021,896 | * | 6/1991 | Horino | 360/73.05 X |
| 5,138,504 | * | 8/1992 | Nishijima et al. | 360/73.05 X |
| 5,262,909 | * | 11/1993 | Choiu et al. | 360/85 |
| 5,313,305 | * | 5/1994 | Harigaya et al. | 348/214 |
| 5,363,254 | * | 11/1994 | Sato | 360/73.05 |

* cited by examiner

Primary Examiner—Andrew L. Sniezek
(74) Attorney, Agent, or Firm—Robin, Blecker & Daley

(57) ABSTRACT

A recording and/or reproducing apparatus having a plurality of tape transport modes is arranged such that, in changing a stop mode over to a desired mode through an intermediate tape transport mode among the plurality of tape transport modes, the tape is allowed to begin to travel when the process of mode change-over comes to the intermediate tape transport mode and the mode change-over process is continued further to the desired tape transport mode, while the tape is thus allowed to travel before the desired tape transport mode is attained. This arrangement substantially shortens the length of time required for mode change-over, so that the operability of the apparatus can be enhanced.

10 Claims, 3 Drawing Sheets

RECORDING AND/OR REPRODUCING APPARATUS

CROSS REFERENCE TO RELATED APPLICATIONS

This application is a divisional application of application Ser. No. 08/567,831, filed Dec. 6, 1995, now abandoned which is a continuation of application Ser. No. 08/102,764, filed Aug. 5, 1993, now abandoned.

BACKGROUND OF THE INVENTION

1. Field of the Invention

This invention relates to a recording and/or reproducing apparatus of the kind using a tape, such as a VTR (video tape recorder) or the like, and more particularly to a mode change-over arrangement of the recording and/or reproducing apparatus.

2. Description of the Related Art

The apparatus of the above-stated kind have included mode change-over means for changing from a stop mode selectively over to one of a plurality of successively-accessible tape transport modes, such as a fast feeding mode, a rewinding mode, a recording/reproducing mode, etc., by mode change-over means. After the stop mode is shifted to a desired mode through some mode other than the selected mode by the mode change-over means, a tape is caused to travel by allowing a tape transport device, such as a capstan, to begin to rotate.

The tape transport device includes a pinch roller which is rotated and a capstan and the tape is pinched between the pinch roller and the capstan. The pinch roller is pressed against the capstan with constant pressure irrespective of the tape transport speed. Where there is another mode such as the fast feeding mode between the stop mode and a selected recording/reproducing mode, the tape is caused to begin an accommodating standby period before recording. By the term accommodating standby period is meant a time during which some tape travel is effected. In the conventional apparatus, the accommodating travel is begun after the process of mode change-over arrives at the selected recording/reproducing mode from the stop mode through the fast feeding mode. A total length of time including a period of time required before commencement of the accommodating travel and a period of time required for completion of the accommodating travel becomes longer than in a case where an apparatus has no fast feeding mode in the process of change-over from a stop mode to a recording/reproducing mode. In other words, the length of time required for the mode change-over degrades the operability of the apparatus.

Another shortcoming of the above-stated arrangement of the conventional apparatus lies in the pinch roller pushing arrangement which not only causes a loss of energy and attendant increase of electric power consumption but also undermines attempts to increase the tape transport speed.

SUMMARY OF THE INVENTION in view of the shortcomings of the conventional apparatus described in the foregoing, it is an object of this invention to provide a recording and/or reproducing apparatus which substantially shortens the length of operating time required for change-over from one mode to another even in a case where the mode of the apparatus is to be changed from a stop mode to a selected tape transport mode through another tape transport mode. Under this object, a recording and/or reproducing apparatus in one embodiment of this invention comprises tape transport means for causing a tape to travel, mode change-over means for changing a transport mode of the tape transport means among a plurality of tape transport modes, the tape transport means being capable of causing the tape to travel in each of the plurality of tape transport modes, and control means for controlling the tape transport means, the control means including mode detecting means for detecting each of the plurality of tape transport modes and being arranged to control the tape transport means in such a manner that, in changing the transport mode of the tape transport means by the mode change-over means from a first mode over to a selected third mode successively through a non-selected second mode, the tape transport means is caused to allow the tape to begin to travel in response to detection of the second mode by the mode detecting means and, while the tape is allowed to travel, the mode change-over means is caused to changed the transport mode of the tape transport means to the third mode.

It is another object of this invention to provide a recording and/or reproducing apparatus which is capable of eliminating the shortcoming of the conventional apparatus in the fast feeding mode or in the rewinding mode mentioned in the foregoing relative to the pinch roller pushing arrangement.

Under that object, a recording and/or reproducing apparatus of this invention comprises tape transport means for transporting a tape, the tape transport means including pinching means for pinching the tape and thereby transporting the tape and having a plurality of tape transport modes having respective different tape transport speeds, mode change-over means for selectively changing over the tape transport means among the plurality of tape transport modes, the plurality of tape transport modes including at least a first transport mode and a second transport mode in which the tape is transported at a higher speed than in the first transport mode, and control means for controlling the pinching means in accordance with each of the plurality of tape transport modes, the control means being arranged to cause a pressed contact force on the tape of the pinching means to be at a predetermined value in the first transport mode and to be at a value lower than the predetermined value in the second transport mode.

The above and other objects and features of this invention will become apparent from the following detailed description of an embodiment thereof taken in connection with the accompanying drawings.

DETAILED DESCRIPTION OF THE PREFERRED EMBODIMENTS

Figure 1:
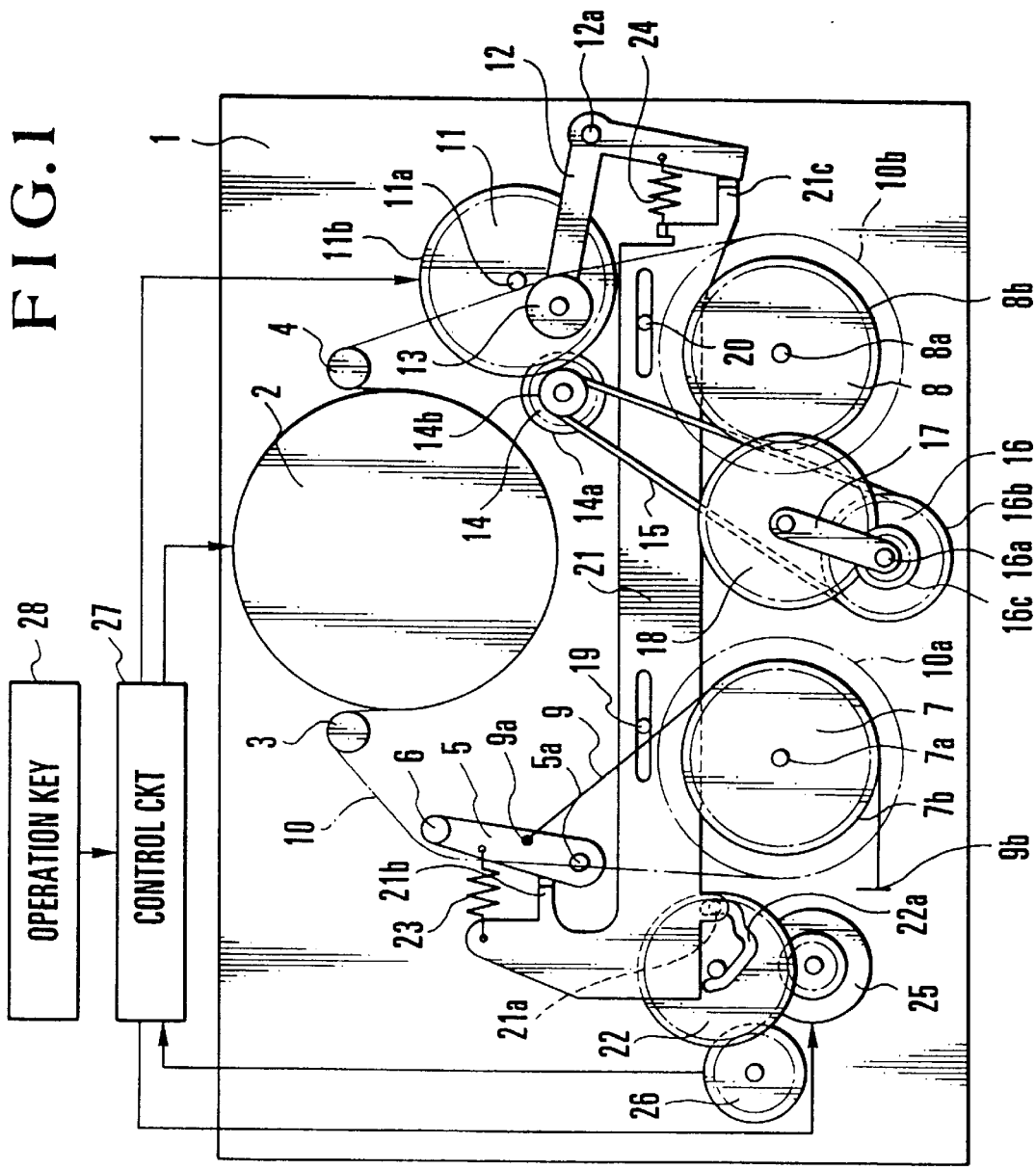
FIG. 1 is a plan view showing an embodiment of the invention in a stop mode.
Figure 2:
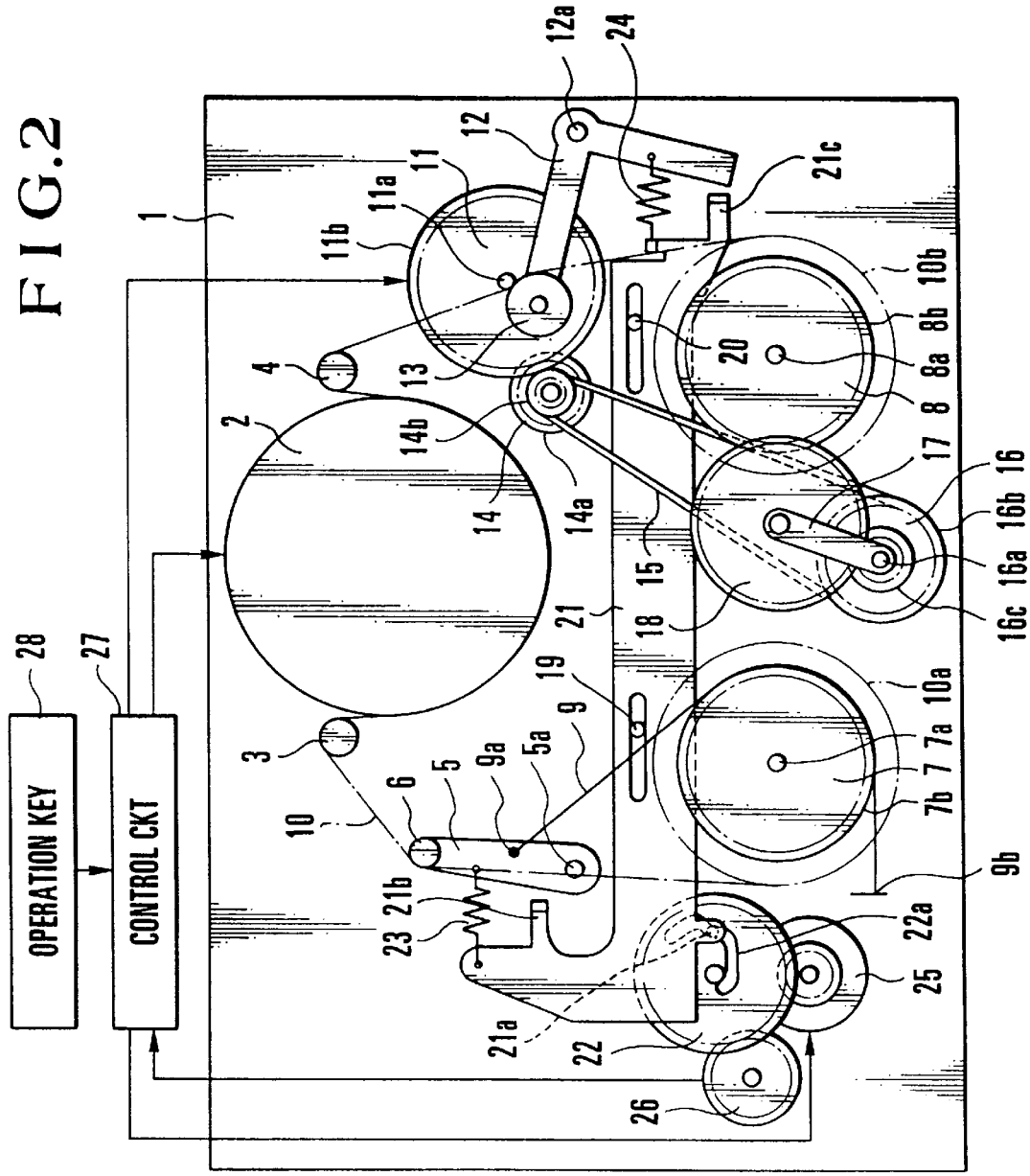
FIG. 2 is a plan view showing the embodiment in a fast feeding/rewinding mode.
Figure 3:
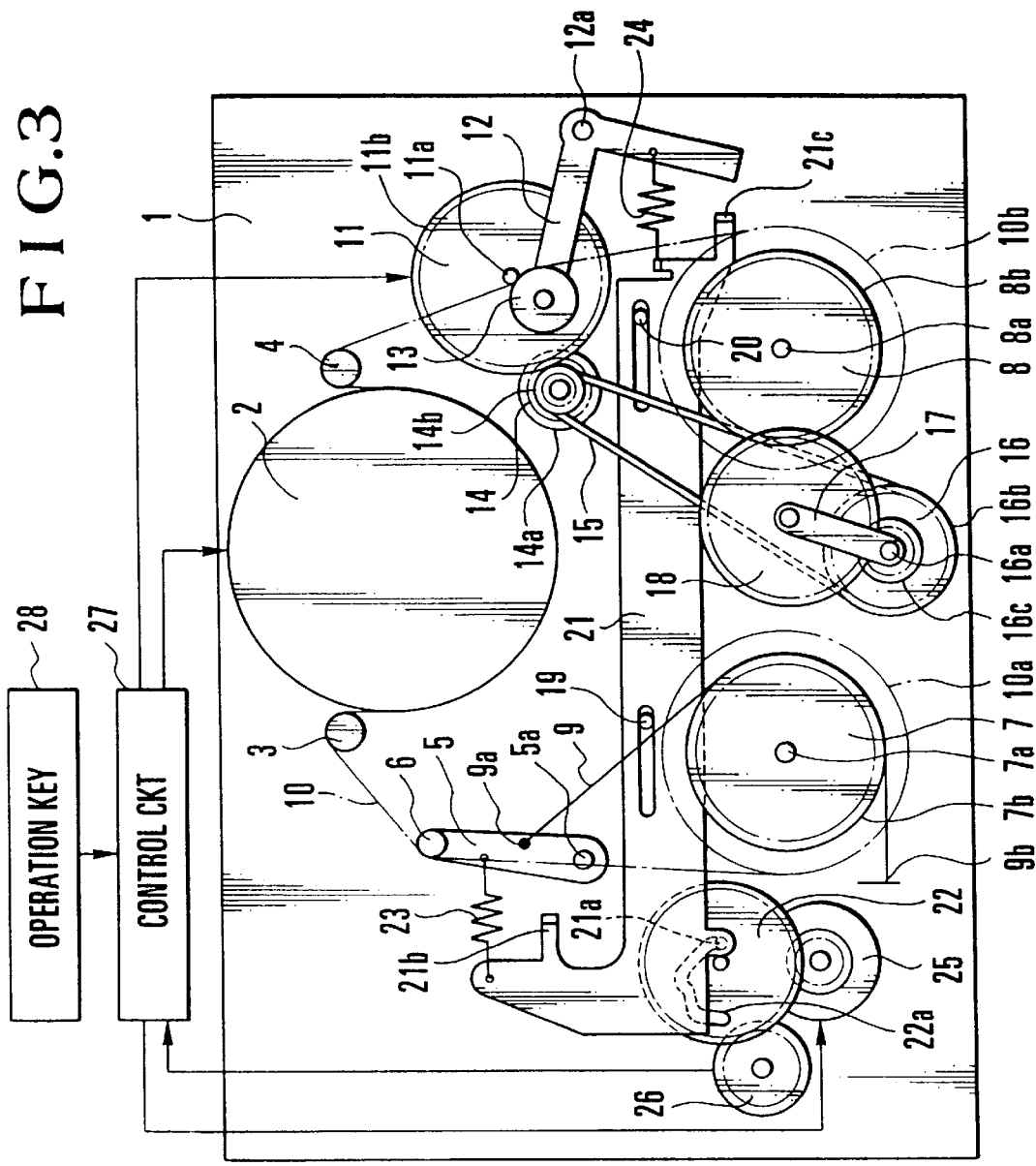
FIG. 3 is a plan view showing the embodiment in a recording/reproducing mode.

The following describes a first embodiment of this invention in which this invention is applied to a VTR. FIGS. 1, 2 and 3 are plan views respectively showing the essential parts of the VTR in different states obtained in different modes of the VTR. FIG. 1 shows the VTR in a stop mode. FIG. 2 shows the VTR in a fast feeding/rewinding mode. FIG. 3 shows the VTR in a recording/reproducing mode.

Referring to these figures, the illustrations include a chassis 1, a rotary drum 2 which includes a motor and heads and is disposed on the chassis 1, and guide posts 3 and 4. A tension arm 5 which is swingable on a shaft 5a mounted on the chassis 1 is provided for detecting a tape tension.

A supply reel mount 7 and a takeup reel mount 8 are arranged on the chassis 1 to be rotatable respectively on shafts 7a and 8a. Gear parts 7b and 8b are formed respectively in the peripheral parts of the supply reel mount 7 and the takeup reel mount 8. Known torque limiters are interposed respectively between the gear part 7b and a reel engaging part (not shown) and between the gear part 8b and a reel engaging part (not shown). A tension belt 9 which is secured to the tension arm 5 at its one end 9a and to the chassis 1 at its other end 9b is wrapped around a circumferential surface other than the gear part 7b in the periphery of the supply reel mount 7.

A tape 10 is arranged to be payed out from a supply reel 10a mounted on the supply reel mount 7. The tape 10 is then disposed successively around the tension pin 6, the guide post 3, the rotary drum 2 and the guide post 4, before it is taken up on a takeup reel 10b mounted on the takeup reel mount 8.

A capstan motor 11 is arranged to have its rotation shaft formed by a capstan 11a and to have a gear part 11b formed on the periphery of its rotor. A pinch roller arm 12 is arranged to be swingable on a shaft 12a mounted on the chassis 1. A pinch roller 13 is rotatably carried by the free end of the pinch roller arm 12. The tape 10 is pinched and carried jointly by the pinch roller 13 and the capstan 11a. A capstan gear 14 is a vertical double gear disposed on the chassis 1. The larger gear part 14a of the capstan gear 14 engages the gear part 11b of the capstan motor 11. The smaller gear part 14b of the capstan gear 14 has a timing belt 15 wrapped therearound.

A drive gear 16 which is a vertical double gear is arranged on the chassis 1 to be rotatable on a shaft 16a. The larger gear part 16b of the drive gear 16 has the above-stated timing belt 15 wrapped therearound. The smaller gear part 16c of the drive gear 16 engages a swingable gear 18 which is rotatably carried by a swingable arm 17. The swingable arm 17 is swingable on the shaft 16a and is arranged to be swung in the direction of rotation of the drive gear 16 following the rotation of the drive gear 16 by a known mechanism. With the swingable arm 17 swung in this manner, the swingable gear 18 is caused to selectively engage the gear part 7b of the supply reel mount 7 or the gear 8b of the takeup reel mount 8.

A mode change-over slider 21 is arranged to be movable to the right and left while being guided by guide pins 19 and 20 upstanding on the chassis 1. A pin 21a provided on the mode change-over slider 21 engages a cam slot 22a formed in a mode change-over gear 22 which is rotatably arranged on the chassis 1. This arrangement may be changed to make a pin erected on the mode change-over gear 22 engage a slot formed in the mode change-over slider 21.

A projection 21b formed at one end of the mode change-over slider 21 is arranged to be capable of abutting on the tension arm 5. Another projection 21c formed at the other end of the mode change-over slider 21 is arranged to be capable of abutting on the pinch roller arm 12. A tension spring 23 is stretched between the one end of the mode change-over slider 21 and the tension arm 5. A pinch spring 24 is stretched between the other end of the mode change-over slider 21 and the pinch roller arm 12.

A mode change-over motor 25 is arranged to rotate the mode change-over gear 22. A mode detection switch 26 is arranged to detect the rotation phase of the mode change-over gear 22. The output of the mode detection switch 26 is sent to a control circuit 27. The control circuit 27 is arranged to control the rotation of the rotary drum 2, that of the capstan motor 11 and that of the mode change-over motor 25 on the basis of information obtained from the mode detection switch 26 and from an operation key part 28.

The mode change-over action of the apparatus arranged as described above is described as follows.

FIG. 1 shows the apparatus in a stop mode. In the stop mode, the mode change-over gear 22 is in a stop position as shown in FIG. 1, and the mode change-over slider 21 has been moved to the right. The tension arm 5 has been pushed by the projection 21b of the mode change-over slider 21 to swing clockwise. At the same time, the pinch roller arm 12 has been pushed by the projection 21c of the mode change-over slider 21 to swing counterclockwise. By this, the tape 10 is released from a tension imparting action of the tension pin 6 and the pinch roller 13 is separated from the capstan 11a.

With the apparatus in this state, when a power supply switch which is disposed at the operation key part 28 is turned on, the apparatus comes to be in a state of standby for recording in a recording/reproducing mode in a case where the apparatus is a camera-integrated type VTR. When the mode change-over motor 25 is activated by the control circuit 27, the mode change-over gear 22 is rotated counterclockwise. Then, as shown in FIG. 2, the mode change-over slider 21 is moved to the left. The pinch roller arm 12 is urged to swing clockwise by the pinch spring 24. The tension arm 5 is urged to swing counterclockwise by the tension spring 23. As a result, the pinch roller 13 is brought into pressed contact with the capstan 11a across the tape 10. A predetermined tension is applied to the tape 10 by the tension pin 6. The tension belt 9 is brought into contact with the peripheral face of the supply reel mount 7. Tension control is then performed in a known manner jointly by the tension pin 6 and the tension belt 9.

When the mode change-over gear 22 rotates to reach a fast feeding/rewinding position as shown in FIG. 2, this position is detected by the mode detection switch 26, and the mode change-over motor 25 comes to a stop.

Following this, the rotary drum 2 is rotated. Next, the capstan 11a is rotated counterclockwise for a predetermined period of time at a predetermined speed. As a result, the tape 10 is transported in a state of being pinched by the capstan 11a and the pinch roller 13. The takeup reel mount 8 is then rotated clockwise by a force transmitted from the gear part 11b of the capstan motor 11 through the capstan gear 14, the timing belt 15, the drive gear 16 and the swingable gear 18. The transported tape 10 is then taken up and wound around the takeup reel 10b.

An accommodating travel of the tape 10 thus begins in the above-stated manner according to the shift of the mode of the apparatus to the fast feeding mode. After commencement of the accommodating travel of the tape 10, the mode change-over motor 25 causes the mode change-over gear 22 to rotate further counterclockwise so as to move the mode change-over slider 21 further to the left. When the mode change-over gear 22 reaches a recording/reproducing position as shown in FIG. 3, this position is detected by the mode detection switch 26, and the mode change-over motor 22 comes to a stop.

Upon completion of the accommodating travel of the tape 10 having been transported for the predetermined period of time, the rotation of the capstan 11a comes to a stop. A recording circuit which is not shown is rendered operative and the apparatus enters the state of standby for recording. In this case, if no recording or reproduction begins after the lapse of a predetermined period of time, the mode of the apparatus comes back to the stop mode.

As described above, in changing the stop mode over to the recording/reproducing mode through the fast feeding mode, the tape 10 is caused to start the accommodating travel when the process of mode change-over comes to the fast feeding mode, and then the process of mode change-over continues while allowing the tape to make the accommodating travel until the recording/reproducing mode is attained. This arrangement substantially shortens the length of time required for the mode shifting process as a period of time required before commencement of the accommodating travel and a period of time required for the accommodating travel become shorter by virtue of the arrangement described.

The mode change-over motor 25 does not have to be brought to a stop. However, with the embodiment arranged to bring the mode change-over motor 25 temporarily to a stop when the rotation of the mode change-over gear 22 reaches the fast feeding/rewinding position during the change-over process, the timing for a start current for the capstan motor 11 can be prevented from overlapping the driving current of the mode change-over motor 25.

Further, the mode change-over may be arranged in a sequence of the stop mode—the recording/reproducing mode—the fast feeding mode, instead of the above-stated sequence of the stop mode—the fast feeding mode—the recording/reproducing mode. In such a case, the capstan motor 11 is actuated when the shift of mode comes to the recording/reproducing mode during the process of the mode change-over from the stop mode to the fast feeding mode. The length of time required for changing the stop mode over to the fast feeding mode can be also substantially shortened by such arrangement. The same advantageous effect is attainable with the fast feeding mode replaced with the rewinding mode.

The embodiment described is arranged to allow the tape to travel by bringing the pinch roller into pressed contact with the capstan in the fast feeding/rewinding mode. The arrangement, however, may be changed to separate the pinch roller from the capstan and to allow the tape to travel directly by the supply reel mounted on the supply reel mount 7 or the takeup reel mounted on the takeup reel mount 8. This arrangement can be easily attained by rotating the arm 12 counterclockwise by the projection 21c of the slider 21 in the embodiment.

With the embodiment arranged in this manner, the time required for the mode change-over action also can be shortened in shifting the stop mode to the recording/reproducing mode through the fast feeding mode, as the capstan begins to rotate in the fast feeding mode and as the recording or reproduction can be allowed to immediately begin by bringing the pinch roller into pressed contact with the capstan when the shift of mode reaches the recording/reproducing mode.

With the apparatus arranged in the above-stated manner, some portion of the tape is allowed to travel in the fast feeding mode to bring forth some blanking area in which no recording is made on the tape in the recording mode. However, this presents no problem as the time required for the shift of mode is generally not long. Besides, since the tape is not allowed to travel in the fast feeding mode in the case of this embodiment, there is no problem at all with respect to this point.

Next, a mechanism which enables the embodiment to smoothly carry out a fast feeding/rewinding action is described as follows. This mechanism is arranged to slacken a little the pinch spring and the tension spring at the time of the fast feeding/rewinding mode. The force of pressed contact of the pinch roller is weakened and the tension of the tape is lowered by this arrangement.

When a reproduction key is pushed at the operation key part 28, the state of the apparatus comes to be in the recording/reproducing mode as shown in FIG. 3. The pinch roller arm 12 is then urged to swing clockwise by the pinch spring 24. The tension arm 5 is urged to swing counterclockwise by the tension spring 23. The pinch roller 13 is thus brought into pressed contact with the capstan 11a across the tape 10. The tension pin 6 strains the tape 10 and, at the same time, brings the tension belt 9 into contact with the peripheral face of the supply reel mount 7. Following this, the rotary drum 2 is caused to rotate. Next, the capstan 11a is rotated counterclockwise. Then, the tape 10 is transported at a reproducing speed in a state of being pinched and sandwiched in between the capstan 11a and the pinch roller 13.

In this state of the recording/reproducing mode, the pressed contact force of the pinch roller 13 on the capstan 11a corresponds to the amount of expansion of the pinch spring 24. Meanwhile, a portion of the tape 10 located before the capstan 11a is caused to have a predetermined amount of tension corresponding to the amount of expansion of the pinch spring 24 by a relation among the supply reel mount 7, the tension belt 9 and the tension arm 5. The tape tension obtained in the recording/reproducing mode is arranged to be an optimum tension for signal exchange between the tape 10 and the head mounted on the rotary drum 2.

When a fast feeding key disposed at the operation key part 28 is pushed, there is obtained the state of the fast feeding mode as shown in FIG. 2. The mode change-over slider 21 moves further to the right than in the state of the recording/reproducing mode. The pinch spring 24 then slackens to weaken the pressed contact force of the pinch roller 13 and, at the same time, the tension spring 23 also slackens to lessen the tension of the portion of the tape 10 located before the capstan 11a. As a result, the tape 10 pinched and sandwiched in between the capstan 11a and the pinch roller 13 becomes smoothly transportable. After that, the rotation of the capstan is accelerated for a fast tape feeding action on the tape 10.

In a case where a rewinding key disposed at the operation key part 28 is pushed, the capstan 11a is rotated in a direction reverse to the normal rotating direction of the fast feeding mode. The supply reel mount 7 is then caused to rotate counterclockwise by the swingable gear 18 to allow the tape 10 to be taken up on the supply reel 10a.

If the reproduction key is again pushed, the mode change-over motor 25 is actuated by the control circuit 27. When the mode change-over gear 22 is rotated counterclockwise to come to its recording/reproducing position as shown in FIG. 3, the mode detection switch 26 detects this position to cause the mode change-over motor 25 to come to a stop. Following this, the rotation of the capstan 11a is decelerated to a reproducing speed.

In the case of the fast feeding mode or the rewinding mode, the pressed contact force of the pinch roller 13 is weakened as the pinch spring 24 slackens more than in the case of the recording/reproducing mode. With the pressed contact force of the pinch roller 13 weakened, the tape feeding force of the capstan 11a decreases. In the case of this embodiment, however, the tension of the tape portion located before the capstan 11a is lowered by slackening the tension spring 23 in the fast feeding mode. Therefore, the tape 10 can be transported without any slippage. In the case of the fast feeding mode, the decrease in the tape tension does not cause any problem as no image signal is output in that mode.

In the case of the rewinding mode, on the other hand, there is some margin in tape feeding power available by means of the capstan 11a. Therefore, a lowered pressed contact force of the pinch roller 13 causes no tape slippage. In the case of rewinding, the tape tension does not have to be changed through the tension spring 23.

Further, in the case of the embodiment, the sequence of processes of moving the mode change-over slider 21 and varying the rotational frequency of the capstan 11a does not have to be the sequence described above, but the sequence may be reversed as desired.

The embodiment is, as described above, arranged to vary the pressed contact force of the pinch roller 13 on the capstan 11a (i.e., on the tape 10) according to the tape transport speed so as to smoothen the transporting action on the tape 10. This arrangement effectively reduces a possible loss of the pressed contact of the pinch roller 13. The power consumption by the capstan motor 11, therefore, can be lessened, and the tape speed can be increased in the fast feeding mode and the rewinding mode.

In accordance with this invention, as described in the foregoing, in changing the stop mode over to one of different tape transport modes through another mode, i.e. an intermediate mode, the tape is allowed to begin to travel when the process of mode change-over comes to the intermediate mode and the mode change-over process is further continued while the tape is thus allowed to travel before the process reaches the desired mode. The invented arrangement substantially shortens the length of time required in shifting one mode to another, so that the operability of the apparatus can be enhanced.

Further, in accordance with this invention, the pressed contact force of the pinch roller is adjusted according to the tape transport speed. Therefore, the tape speed can be increased in fast feeding or rewinding the tape, and also the amount of power consumption by the capstan motor can be lessened.

What is claimed is:

1. A recording and/or reproducing apparatus comprising:
    a) tape transport means for causing a tape to travel, said tape transport means including feeding means for feeding the tape in a plurality of tape transport modes having respective different tape transport speeds;
    b) mode selecting means for selecting one of the plurality of tape transport modes, the plurality of tape transport modes including at least a first transport mode, a second transport mode in which the tape is transported at a higher speed than in the first transport mode and a third transport mode in which the tape is transported at a higher speed than in the second transport mode; and
    c) control means for controlling said tape transport means on the basis of a mode selecting operation of said mode selecting means such as to change the tape transport mode of said tape transports means from the first transport mode to the second transport mode through the third transport mode and to start a driving of the tape in response to a shifting operation from the first transport mode to the third transport mode, when the tape transport mode is switched from the first transport mode to the second transport mode by said mode selecting means.

2. An apparatus according to claim 1, further comprising tension imparting means for imparting tension to the tape, and wherein said control means is further arranged to control said tension imparting means in such a manner that the tension is higher in the second transport mode than in the third transport mode.

3. An apparatus according to claim 1, wherein the plurality of tape transport modes include a stop mode, a recording/reproducing mode and a fast feeding mode, respectively corresponding to the first mode, the second mode and the third mode.

4. An apparatus according to claim 3, wherein said control means includes instruction means for generating an instruction for a reproducing or recording operation, and wherein said mode selecting means is arranged to switch the transport mode of said tape transport means from the recording/reproducing mode to the stop mode if the instruction is not generated from said instruction means for a predetermined period of time after the recording/reproducing mode is set.

5. An apparatus according to claim 1, wherein said mode selecting means includes a driving motor, and wherein said control means is arranged to temporarily stop said driving motor in response to detection of the third transport mode by mode detecting means, and then cause said tape transport means to start to travel the tape.

6. A tape transporting apparatus comprising:
    a) tape transport means for causing a tape to travel, said tape transport means including feeding means for feeding the tape in a plurality of tape transport modes having respective different tape transport speeds and different pressures of pinching the tape;
    b) mode selecting means for selecting one of the plurality of tape transport modes, the plurality of tape transport modes including at least a first transport mode, a second transport mode in which the tape is transported at a higher speed than in the first transport mode and a third transport mode in which the tape is transported at a higher speed than in the second transport mode; and
    c) control means for controlling said tape transport means on the basis of a mode selecting operation of said mode selecting means such as to change the tape transport mode of said tape transports means from the first transport mode to the second transport mode through the third transport mode and to start a driving of the tape in response to a shifting operation from the first transport mode to the third transport mode, when the tape transport mode is switched from the first transport mode to the second transport mode by said mode selecting means.

7. An apparatus according to claim 6, further comprising tension imparting means for imparting tension to the tape, and wherein said control means is further arranged to control said tension imparting means in such a manner that the tension is higher in the second transport mode than in the third transport mode.

8. An apparatus according to claim 7, wherein said control means is arranged such that, in switching the tape transport mode of said tape transport means from the stop mode to the recording/reproducing mode, the stop mode is changed to the recording/reproducing mode through the fast feeding mode.

9. An apparatus according to claim 6, wherein the plurality of tape transport modes include a stop mode, a fast feeding mode and a recording/reproducing mode.

10. An apparatus according to claim 6, wherein said mode selecting means includes a driving motor, and wherein said control means is arranged to temporarily stop said driving motor in response to detecting of the third transport mode by mode detecting means and then cause said tape transport means to start to travel the tape.

* * * * *

UNITED STATES PATENT AND TRADEMARK OFFICE
CERTIFICATE OF CORRECTION

PATENT NO.    : 6,282,047 B1
DATED         : August 28, 2001
INVENTOR(S)   : Junji Kobayashi It is certified that error appears in the above-identified patent and that said Letters Patent is hereby corrected as shown below:

Column 1,
Line 59, delete "in view of" and insert -- In view of --.

Signed and Sealed this

Third Day of September, 2002

Attest:

Attesting Officer

JAMES E. ROGAN
Director of the United States Patent and Trademark Office